UNITED STATES PATENT OFFICE.

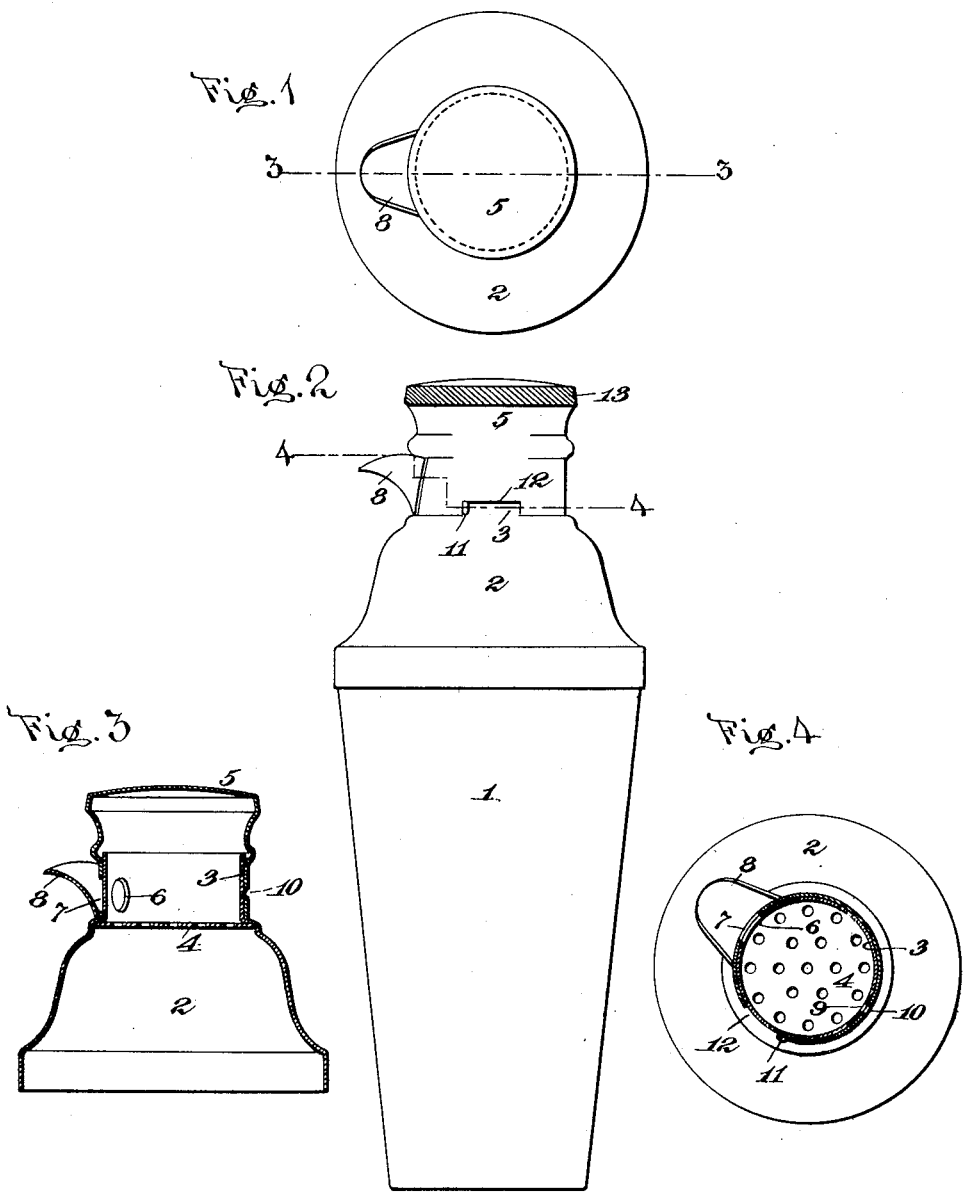

WALTER G. BARKER, OF NEW YORK, N. Y., ASSIGNOR TO S. STERNAU & COMPANY, OF BROOKLYN, NEW YORK, A COPARTNERSHIP.

BEVERAGE-SHAKER.

1,042,751.  Specification of Letters Patent.  Patented Oct. 29, 1912.

Application filed March 1, 1912. Serial No. 680,975.

*To all whom it may concern:*

Be it known that I, WALTER G. BARKER, a citizen of the United States, residing in the borough of Manhattan, city, county, and State of New York, have invented a certain new and useful Beverage-Shaker, of which the following is a specification.

The object I have in view is the production of a beverage shaker particularly for mixing iced beverages such as lemonades, cocktails, etc., which will facilitate pouring the beverage after it is shaken.

A further object is to produce a device which will be kept closed during the shaking operation.

An additional object is to produce a device which may be readily separated for cleaning purposes.

These and further objects will more fully appear from the following specification and accompanying drawings, considered together or separately.

In the drawings, Figure 1 is a plan view of a device embodying my invention. Fig. 2 is a side elevation of the same. Fig. 3 is a section through the upper part, on the line 3—3 of Fig. 1, the orifices being shown in closed position. Fig. 4 is a section on the line 4—4 of Fig. 2, the orifices being shown in open position.

In all of the views, like parts are designated by the same reference characters.

Referring to the drawings, 1 is a receptacle, which may be made of metal, glass, or any other suitable substance. The receptacle is inclosed by a cover 2. The cover is provided with a circular neck 3. It is also preferably, but not necessarily, provided with a screen 4. The cover is inclosed by a cap 5. This cap has a circular bottom portion which closely engages with the cylindrical neck 3. The neck 3 is provided with an emptying or pouring opening 6. The cap 5 is provided with an emptying opening 7. These openings are preferably of the same size and are so located that when the cap is rotated upon the neck, the two openings may be brought into coincidence. In order to facilitate the pouring of the contents of the receptacle through the openings when they are in coincidence, the cap is preferably, though not necessarily, provided with a spout 8. This spout is located adjacent to the opening 7. For the purpose of permitting entrance of air when the contents of the receptacle are being poured out, an air vent is provided. This air vent comprises an opening 9 in the neck, and an opening 10 in the cap. These two openings are so arranged that they are in alinement when the two pouring openings are in alinement.

In order to determine the alinement of the openings, and also to insure the openings being closed by a sufficient extent of rotation of the cap, upon the neck, an alining device is provided. In the device chosen for illustration it comprises an ear 11, formed upon the neck, and a notch 12, formed on the cap. The peripheral length of the notch is such that it will permit a sufficient extent of rotation of the cap upon the neck to bring the pouring openings in alinement, when rotated in one direction, and to bring them in such position that the openings will be closed by the cap or neck when it is rotated in the other direction.

For the purpose of more readily facilitating the turning of the cap or its removal from the neck, the upper edge of the cap is provided with knurled notches 13.

The device as described may be modified, and the dimensions and configurations illustrated may be departed from; the structure shown being solely for the purpose of illustration.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A beverage shaker having a cover and a rotatable cap, each having an opening which may be brought in coincidence by relative rotary movement of said cap and cover.

2. A beverage shaker having a cover, a rotatable cap therefor, pouring openings which are brought into coincidence by relative movement of the cap and cover, and air vents which are simultaneously brought in coincidence by such rotary movement.

3. A beverage shaker comprising a cover, a rotatable cap therefor, pouring openings which may be brought in coincidence by a relative rotary movement of the cap and cover, and a limiting stop for defining the position of the parts when the openings are in coincidence.

4. A beverage shaker having a cover, a rotatable cap thereon, a pouring opening in the cover, a pouring opening in the cap, and a spout on the cap, adjacent to the pouring opening therein, the said cap being rotatably mounted on the cover so that the two openings may be brought into coincidence by a relative rotary movement of the cap and cover.

5. A beverage shaker having a cover and a cylindrical neck thereon, a pouring opening in the neck, a stop on the neck, a cover rotatably mounted on the neck, said cover having a pouring opening adapted to be brought into coincidence with the opening in the neck, and a notch adapted to engage with the stop, the length of the notch being such that it will limit the rotary movement of the cap and will aline the cap so that the two pouring openings will be in coincidence.

This specification signed and witnessed this 24 day of February, 1912.

WALTER G. BARKER.

Witnesses:
JOSEPH F. STEEGMULLER,
P. B. NASH.